US011015666B2

(12) United States Patent
Bramson (10) Patent No.: US 11,015,666 B2
(45) Date of Patent: May 25, 2021

(54) SELECTABLE TORQUE TRANSFER MECHANISM FOR A VEHICLE TRANSMISSION

(71) Applicant: Ford Global Technologies, LLC, Dearborn, MI (US)

(72) Inventor: Eric David Bramson, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 113 days.

(21) Appl. No.: 16/419,078

(22) Filed: May 22, 2019

(65) Prior Publication Data

US 2020/0370611 A1  Nov. 26, 2020

(51) Int. Cl.
| | |
|---|---|
| *F16D 63/00* | (2006.01) |
| *B60K 6/445* | (2007.10) |
| *B60K 6/30* | (2007.10) |
| *F16F 15/30* | (2006.01) |
| *H02K 7/02* | (2006.01) |
| *H02K 7/116* | (2006.01) |
| *H02K 7/102* | (2006.01) |
| *H02K 7/00* | (2006.01) |
| *F16D 41/16* | (2006.01) |

(52) U.S. Cl.
CPC ............. *F16D 63/006* (2013.01); *B60K 6/30* (2013.01); *B60K 6/445* (2013.01); *F16D 41/16* (2013.01); *F16F 15/30* (2013.01); *H02K 7/006* (2013.01); *H02K 7/02* (2013.01); *H02K 7/1023* (2013.01); *H02K 7/116* (2013.01); *B60Y 2200/92* (2013.01)

(58) Field of Classification Search
CPC ....... F16D 63/006; F16D 41/16; H02K 7/006; H02K 7/116; H02K 7/1023; H02K 7/02; B60K 6/30; B60K 6/445; F16F 15/30; B60Y 2200/92
See application file for complete search history.

(56) References Cited

U.S. PATENT DOCUMENTS

| | | | |
|---|---|---|---|
| 8,083,042 B2 | 12/2011 | Samie et al. | |
| 9,657,791 B2* | 5/2017 | Corsetti | ............... F16D 41/30 |
| 10,100,883 B2* | 10/2018 | Martin | ................. F16D 23/00 |
| 2016/0129900 A1* | 5/2016 | Cho | ..................... B60K 6/365 701/22 |
| 2016/0160941 A1 | 6/2016 | Green et al. | |
| 2018/0003247 A1 | 1/2018 | Samie et al. | |
| 2018/0340578 A1* | 11/2018 | Hand | ..................... F16D 27/09 |
| 2019/0178312 A1* | 6/2019 | Reiter | .................... C22C 38/08 |
| 2019/0293519 A1* | 9/2019 | Ota | ...................... B60W 20/50 |

* cited by examiner

*Primary Examiner* — Justin Holmes
(74) *Attorney, Agent, or Firm* — David B. Kelley; Brooks Kushman P.C.

(57) ABSTRACT

A vehicle powertrain includes an internal combustion engine having a crankshaft coupled to a flywheel having a ring gear. The powertrain also includes a transmission having an input shaft coupled to the flywheel and a brake mechanism having a pivotable rocker configured to selectively inhibit crankshaft rotation. The brake mechanism also includes an electric actuator configured to drive a plunger in connection with a first end of the rocker, wherein the first end engages the ring gear in a first position to inhibit forward rotation and a second end of the rocker engages the ring gear in a second position to inhibit rearward rotation.

16 Claims, 6 Drawing Sheets

SELECTABLE TORQUE TRANSFER MECHANISM FOR A VEHICLE TRANSMISSION

TECHNICAL FIELD

The present disclosure relates to a vehicle powertrain transmission having selectable torque transfer modes.

INTRODUCTION

Vehicle powertrains may include multiple torque-generating propulsion sources including a combustion engine and at least one electric machine. Such powertrains may also include one or more gear sets to transfer torque output from any of the propulsion sources to the vehicle wheels. The gear sets may provide multiple output ratios based on actuating one or more clutches or other internal components to influence the powertrain output. When the engine is deactivated from generating torque and the vehicle is driven by other propulsion sources, movement of the gear sets and other powertrain elements may cause unnecessary rotation of the engine.

SUMMARY

A vehicle powertrain includes an internal combustion engine having a crankshaft coupled to a flywheel having a ring gear. The powertrain also includes a transmission having an input shaft coupled to the flywheel and a brake mechanism having a pivotable rocker configured to selectively inhibit crankshaft rotation. The brake mechanism also includes an electric actuator configured to drive a plunger in connection with a first end of the rocker, wherein the first end engages the ring gear in a first position to inhibit forward rotation and a second end of the rocker engages the ring gear in a second position to inhibit rearward rotation.

A vehicle powertrain includes an internal combustion engine having a crankshaft coupled to a flywheel having a ring gear and a planetary gear set having a sun driveably connected to a first electric machine. The vehicle powertrain also includes a carrier coupled to the flywheel, and a ring driveably connected to a differential. The vehicle powertrain further includes a second electric machine driveably connected to the differential. The vehicle powertrain further includes a brake mechanism having a solenoid configured to drive a first end of a rocker to selectively inhibit crankshaft rotation, wherein the solenoid drives the first end toward a center of the ring gear to inhibit forward rotation and drives the first end away from the center to inhibit rearward rotation.

A transmission includes a flywheel having a ring gear adapted for fixation to a crankshaft of an internal combustion engine and an input shaft coupled to the flywheel. The transmission also includes a brake mechanism having a pivotable rocker configured to selectively inhibit crankshaft rotation. The brake mechanism also includes a solenoid configured to drive a first end of the rocker to a first position to engage the ring gear to inhibit forward rotation, and to drive the first end to a second position to cause a second end of the rocker to engage the ring gear to inhibit rearward rotation.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A vehicle transmission located along a driveline may receive input torque from a propulsion source, for example, such as an engine or electric motor, or both in combination. The transmission may then transmit the torque to an output location such as a driveline to propel vehicle road wheels. The transmission may include one or more selectable torque transfer elements which influence the particular mode of torque transfer. In some examples, a friction clutch may selectively transfer torque when pressure is applied to couple at least one driving input plate with one more driven output plates. When the pressure is released, the plates are decoupled thereby allowing relative rotational slip between the input plates and the output plates. Such friction disc clutch arrangements may impart significant drag during transitioning states as well as during a fully decoupled state.

Other types of coupling mechanisms may include a positive torque-engaging element having discrete coupled and decoupled states to function as a braking arrangement with little or no slipping transition states. In some examples, a braking arrangement may include articulating elements which restrict rotation in a first rotation direction in order to transfer torque, and at the same time allow relative rotation in a second rotation direction in order to provide relative slip between input and output components. A selectable one-way braking arrangement permits rotation in a free-wheeling first direction and is rotationally fixed to restrict rotation in a locked second direction of rotation. In further examples, it may be desirable to provide braking to one or more internal gears to influence the mode of torque transfer through the transmission, such as with a planetary gear set configuration for example.

In a hybrid vehicle having a propulsion system with a power split layout, an engine-driven generator may provide electric power to a traction motor that in turn drives the vehicle wheels. It may be advantageous under certain conditions to lock the engine crankshaft to inhibit rotation, allowing the battery to power both the motor and generator to drive the road wheels. This condition may yield higher torque output and greater capability compared to allowing the crankshaft to rotate. A normally-open selectable one-way braking arrangement that prevents backward rotation of the engine permits the generator to contribute to wheel torque when in the forward gear only. Similarly, a normally-open selectable one-way braking arrangement that selectively prevents forward rotation of the engine permits the generator to contribute to wheel torque in reverse only. A two-way braking arrangement that stops all rotation of the engine would allow both directions of generator torque to efficiently pass to the wheels. Aspects of the present disclosure provide selectable one-way braking in either direction depending on the propulsion system operating mode.

Figure 1:
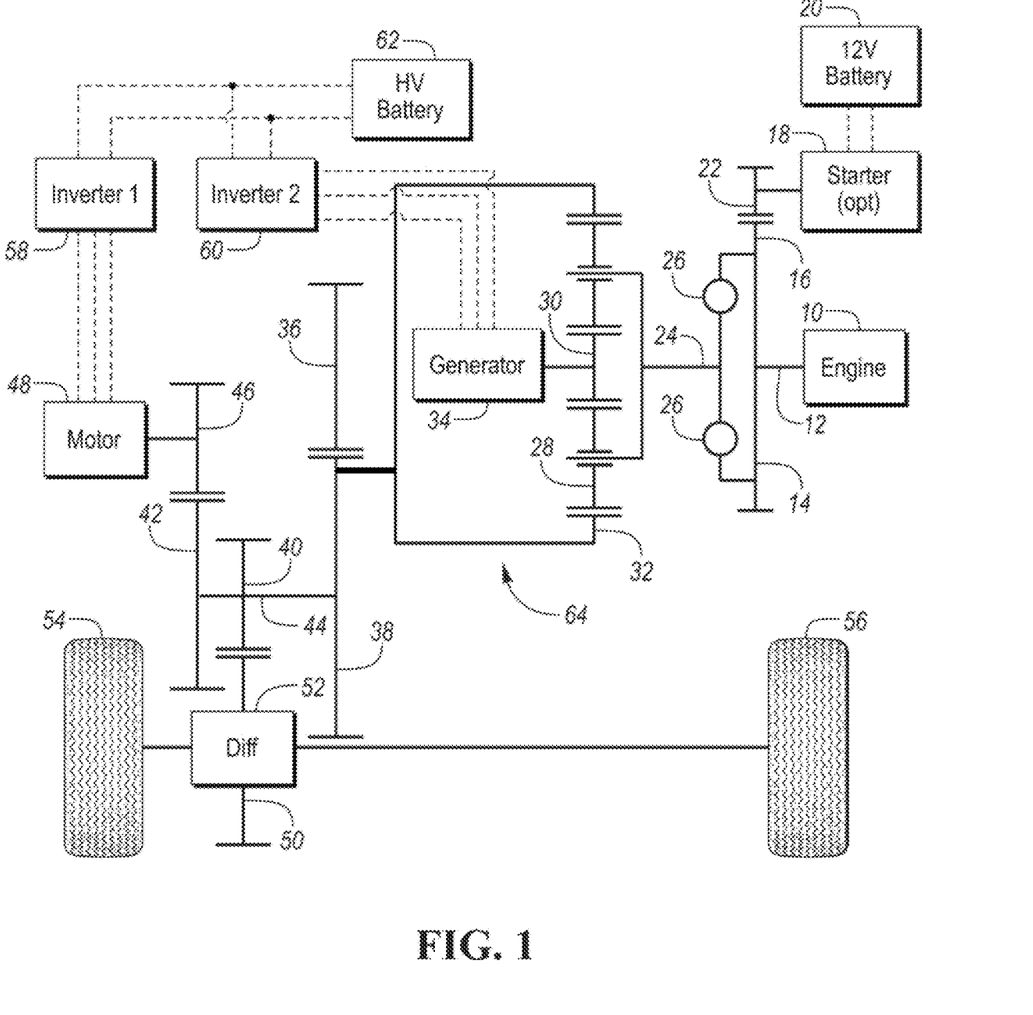
FIG. 1 is a schematic diagram of a hybrid electric powertrain.

FIG. 1 schematically illustrates a kinematic arrangement for a power-split type hybrid electric vehicle. Power is output from engine 10 which drives a crankshaft 12. The crankshaft 12 is fixedly coupled to a flywheel 14. The inertia of the flywheel 14 helps to reduce rotational speed variation due to the firing pulses produced by an internal combustion engine. A ring gear 16 is fixed to the outer periphery of flywheel 14. In some examples, a starter 18 driven by low-voltage battery 20 may drive a pinion gear 22. In other examples, a high-voltage traction battery may be used to drive the starter 18 as well as power a traction motor. To start the engine 10, the pinion gear 22 is moved into engagement with the ring gear 16, and power is provided to starter 18 to bring the crankshaft rotation up to a speed at which engine combustion can be sustained. Once the engine is started, the pinion gear may be disengaged from the ring gear to avoid subjecting the starter motor 18 to high engine speeds. In alternate examples, different components can be configured to start the engine, so the starter motor need not be present in all examples. Transmission input shaft 24 is driven by the flywheel 14 via a torsional isolator 66 which further shields the transmission from engine torque pulses. The flywheel and torsional isolator are commonly located outside of a sealed case of the transmission.

Transmission input shaft 24 is fixedly coupled to planet carrier 26. A set of planet gears 28 are supported for rotation with respect to carrier 26. A sun gear 30 and ring gear 32 are each supported for rotation about the same axis as carrier 26 and each mesh with the planet gears 28. Generator 34 is fixedly coupled to the sun gear 30. Layshaft gear 36 is fixedly coupled to ring gear 32 and meshes with layshaft gear 38. Layshaft gear 38 is fixedly coupled to layshaft gears 40 and 42 via shaft 44. Layshaft gear 46 meshes with layshaft gear 42 and is fixedly couple to motor 48. Layshaft gear 40 meshes with layshaft gear 50 which is the input to differential 52. Differential 52 individually drives road wheels 54 and 56 allowing slight speed differences as the vehicle turns a corner.

Generator 34 and electric motor 48 are both reversible electric machines. Both electric machines are capable of converting electrical power to mechanical power or converting mechanical power to electrical power. In the example of FIG. 1, each machine is a synchronous alternating-current (AC) motor that operates using 3 phase power. Electric motor 48 is powered via inverter 58. Similarly, generator 34 is powered via inverter 60. Both inverters are electrically connected to high-voltage traction battery 62.

The planetary gear set, differential 52, generator 34, electric motor 48, and layshaft gearing among these components may be generally referred to in collection as a transmission 64. In some examples, all of these components are contained within an outer housing called a transmission case. The inverters 58 and 60 may be mounted to the outside of the transmission case or may be mounted remotely therefrom. Transmission input shaft 24 and two half-shafts on the output side may be arranged to penetrate the transmission case.

In some circumstances, engine 10 may generate more power than required to drive the vehicle wheels 54 and 56, with the excess power being delivered to and stored in traction battery 62. In other circumstances, power may flow from battery 62 to drive electric motor 48 allowing the engine 10 to produce less power than the instantaneous demand of the vehicle. In some examples, the engine 10 may be deactivated while power to propel the vehicles comes solely from the traction battery 62. In other examples, such as during braking maneuvers, electric motor 48 may exert negative torque, thus producing electrical energy that is stored in battery 62 to reduce future use of engine 10. Use of the electric motor 48 to provide braking in this manner may be referred to as regenerative braking.

The engine 10 may also be started without using starter 18 by using torque output from generator 34. As long as there is a reaction torque at ring gear 32, torque produced by generator 34 will tend to rotate the engine crankshaft 12. The reaction torque at ring gear 32 may be provided by motor 48, a parking pawl (if the vehicle is stationary), or by inertia of the vehicle.

The total torque exerted on the vehicle wheels is a function of a combination of the torque output by any of the electric motor 48, generator 34, and the torque applied at transmission input shaft 24. Torque generated by motor 48 is transmitted at a fixed ratio to the wheels, with the ratio dictated by the tooth numbers of gears 46, 42, 40, and 50. Torque applied to ring gear 32 is also transmitted at a fixed ratio to the wheels, with the ratio determined by tooth number of gears 36, 38, 40, and 50. The torque exerted on ring gear 32 is generally proportional to the torque exerted on sun gear 30 and on carrier 26. In most operating conditions, the torque exerted on sun gear 30 is generated by generator 34 and the torque exerted on carrier 26 is generated by engine 10. However, when the engine is deactivated, the torque that it exerts on carrier 26 is limited to engine friction, which is generally orders of magnitude less than the torque capacity when the engine is running. Therefore, unless some other device is added, generator 34 is hindered from contributing its full capability to wheel torque when the engine is deactivated.

One option for exerting torque on carrier 26 while the engine is deactivated is application of a braking element on transmission input shaft 24. In this case, once the transmission input shaft is fixed preventing rotation, generating a reaction torque does not require additional power generation. With a brake fully engaged at the transmission input shaft 24, torque generated by generator 34 is more directly transmitted to the vehicle wheels 54 and 56. The torque contribution may be either in the positive direction or negative direction, and may be exerted while the vehicle moves forward, moves backward, or is stationary. For example, when the driver wants to propel the vehicle faster, the generator contributes torque in the same direction as vehicle motion, which requires use of electrical energy. This can be particularly useful for reverse driving since the engine is not capable of contributing sustained reverse wheel torque. During a regenerative braking maneuver, the generator may contribute wheel torque opposite of the direction of vehicle movement, resulting in the generation of electrical power to be stored in battery 62. This aspect may be useful at lower speeds where the capability of the powertrain to recover energy is limited by the torque capacity as opposed to being limited by the capacity of the battery to absorb the energy.

Applying a braking element on transmission input shaft 24 may pose a number of challenges. Specifically, the axial length of the transmission is commonly limited by package space constraints. A brake on the transmission input shaft is very likely to increase the overall axial length of the transmission, adding to the package space requirements. Secondly, the types of brakes typically used in automotive transmissions are often actuated by hydraulic pressure. The transmission of FIG. 1 does not include a hydraulic pump capable of generating sufficient pressure and a valve body to control and direct that pressure to a hydraulically controlled brake. Thus, a significant number of additional components may be required in order to apply a traditional brake to the transmission input shaft, therefore increasing cost and complexity.

Figure 2:
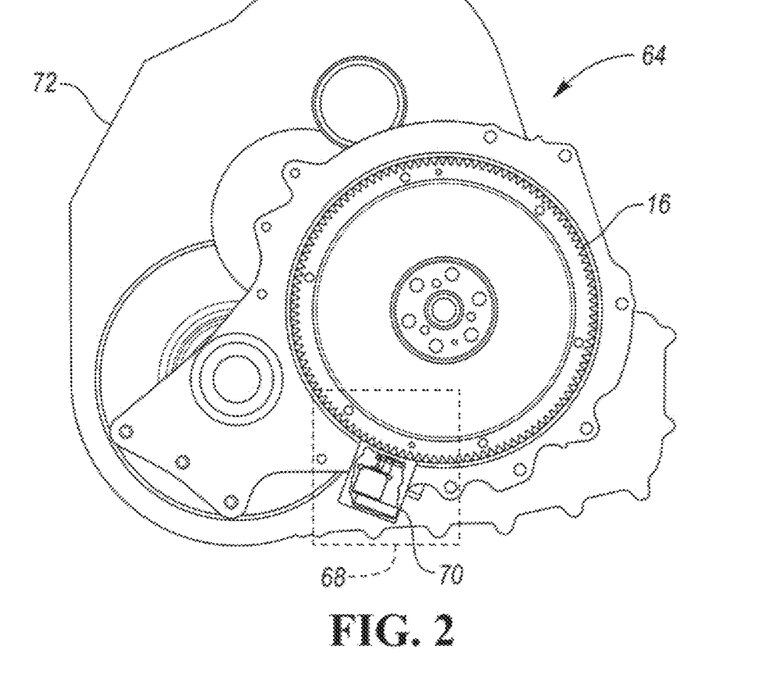
FIG. 2 is an end view of a transmission and flywheel.

FIG. 2 depicts an end view of a transmission and flywheel. According to aspects of the present disclosure, an electrically-actuated brake configured to engage ring gear 16 resolves the packaging issues described above and does not require the cost and complexity associated with enhancement of the transmission hydraulic system. Region 68 illustrates a potential location of an electro-magnetically actuated engine brake mechanism 70. The brake mechanism and its actuation mechanism are mounted externally to transmission case 72. The brake engages ring gear 16 to prevent rotation of crankshaft 12, transmission input shaft 24, and carrier 26. As discussed above, it may be advantageous under certain conditions to lock the engine crankshaft to inhibit rotation to allow the generator to output torque to contribute to wheel torque without turning the engine shaft. Preventing backward rotation of the engine permits the generator to contribute to wheel torque when in a forward gear. Similarly, preventing forward rotation of the engine permits the generator to contribute to wheel torque in a reverse gear. According to some examples, an engine brake mechanism is coupled to the transmission case and is configured to selectively activate to engage the engine crankshaft to restrict rotation.

Additional aspects of the examples of the present disclosure include a selectable engine brake mechanism configured to avoid issues caused by a failure to return from an active state to an inactive state due to problems such as broken spring, excess friction, inability to remove torque across the brake mechanism, or other reasons. If, for example, the brake mechanism is stuck in an activated position such that it prevents the engine crankshaft from spinning forward, the engine cannot be started, and the battery may be unduly drained due to overreliance on electrically powered propulsion. In the case of a one-way engine brake, the generator could potentially rotate the engine crankshaft in the opposite direction in order to un-stick the selectable one-way engine brake, mechanically restoring it to the inactive position. However, this failure recovery may not be possible with a dual direction engine brake, as rotation of engine crankshaft is inhibited in both the forward and backward directions. While it may be possible to implement two separate one-way engine brake mechanisms, with one for each direction of rotation, this solution is costly and consumes excessive package space. Examples of the present disclosure address this challenge and provide an engine brake that selectively prevents engine rotation in either of a first and a second rotation direction, yet still allows for clutch failure recovery.

Figure 3:
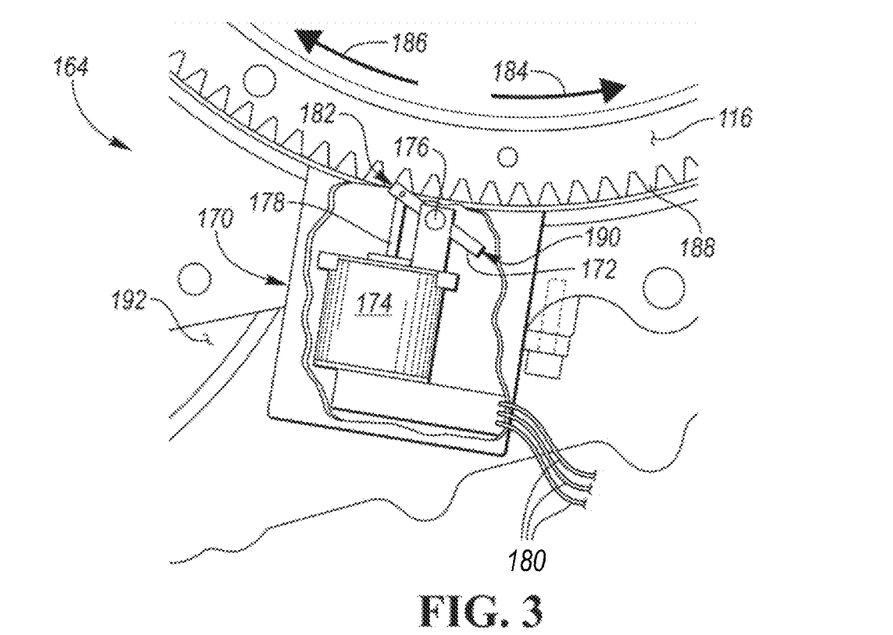
FIG. 3 is an end view of a transmission brake mechanism in a first position.
Figure 4:
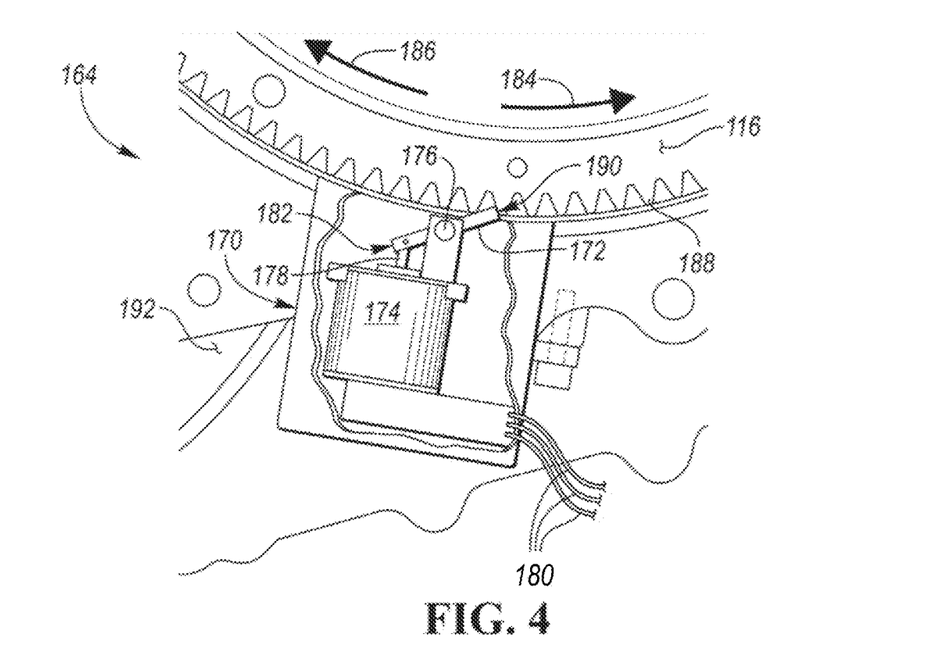
FIG. 4 is an end view of a transmission brake mechanism in a second position.
Figure 5:
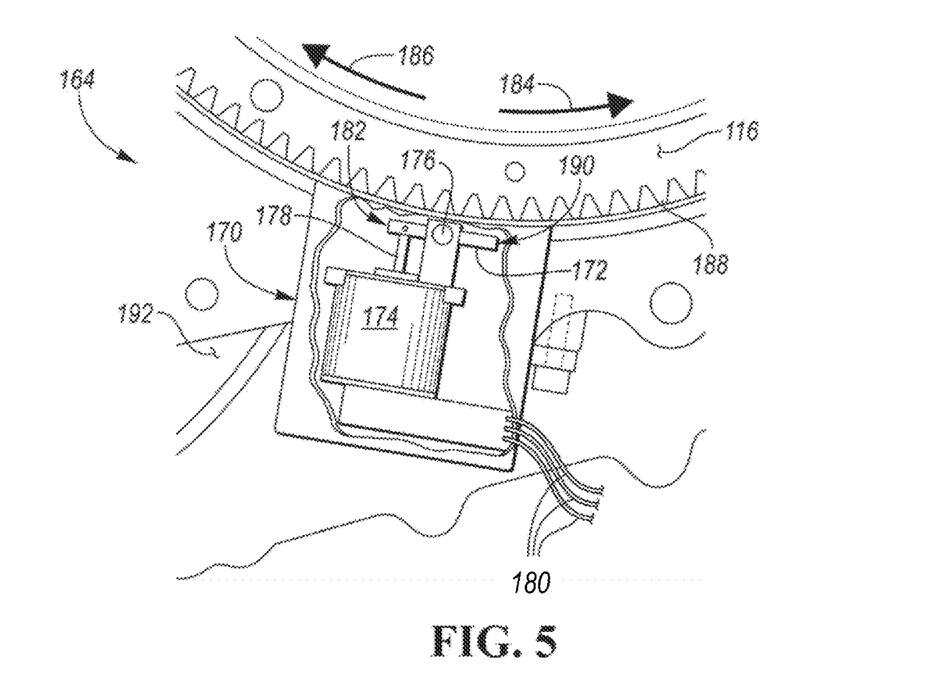
FIG. 5 is an end view of a transmission brake mechanism in a third position.

Referring collectively to FIG. 3 through FIG. 5, a transmission 164 includes a one-way engine brake mechanism 170 having different actuated positions to lock the engine in either forward or reverse direction, respectively, but not both simultaneously. The engine brake mechanism 170 includes an electrically-actuated rocker mechanism wherein a rotatable rocker 172 is actuated by a solenoid 174. The rocker 172 may be a steel bar having a pivot point near the center. The rocker 172 is pivotably secured to a fulcrum 176 to rotate either of opposing ends toward or away from the ring gear 116. The fulcrum 176 may include a pivot bearing and housing that are directly or indirectly fixed to the transmission case 192 in proximity to the flywheel ring gear 116. The pivot bearing and housing may be arranged on a radial line to the center of the gear 116. Thus, the rocker 172 can rotate back and forth alternately engaging and disengaging each opposing end of the rocker bar with the gear teeth. This arrangement creates a "break-before-make" engine brake mechanism in which the brake must go through an unlocked state before transitioning to a locked state in an opposite direction.

The solenoid 174 may include an electromechanical actuator combined with at least one biasing member, for example such as a spring, within the solenoid housing to bias a solenoid plunger 178 toward a predetermined position when the solenoid 174 is not energized. In some examples, the solenoid 174 may employ two separate opposing direction coils acting upon the plunger 178, which may be formed from a single iron shaft. One coil extends the plunger 178 radially toward the flywheel center, while the other coil retracts the plunger 178 radially outward away from the flywheel center. When no power is applied to any coil, a spring returns the plunger 178 to the neutral center position. The plunger 178 is pivotally connected near a first end 182 of the rocker 172 so that the rocker is actuated as the plunger moves. The connection can be a pin-in-slot arrangement or any other kinematically-suitable connection that allows radial force to be applied in either direction. In alternate examples, the solenoid 174 may employ a single reversible polarity coil with a plunger 178 having a permanent magnet shaft. In this case, supplying a first polarity electric current creates a magnetic field that extends the plunger radially toward the center of the ring gear, while applying an opposite, second polarity current retracts the plunger radially outward away from the center. Further alternate examples may use an electric motor to actuate the rocker. While the present disclosure presents an electric actuator as being oriented to actuate a plunger either away from or towards the center of a rotating engine component, it should be appreciated that alternative examples may include an actuator oriented to actuate along other directions besides toward or away from a flywheel center. More specifically, some examples, may include additional linkage components which cause engagement to the flywheel based on a tangential direction of plunger actuation.

Power may be provided to the solenoid 174 via an electrical connection 180 that is in electrical communication with a power supply (e.g., 12V battery or HV traction battery). According to some examples, power having positive polarity supplied via connection 180 moves the plunger 178 in a first direction and negative polarity power moves the plunger 178 in an opposite second direction. A solenoid configured to actuate in dual directions based on reversing polarity may include a permanent magnet in connection with the plunger. It should be appreciated that while particular movement directions are described herein by way of example, positive and negative polarity may invoke different directions of movement in other applications.

The engine brake mechanism 170 may define several predetermined positions, with each position interfacing differently with the ring gear 116. According to some examples, the engine brake mechanism 170 engages the ring gear 116 in a first position to cause a reverse locked condition. The engine brake mechanism 170 also disengages from the ring gear 116 in a neutral position to cause a dual-direction unlocked condition. The engine brake mechanism further engages the ring gear 116 in a second position to cause a forward locked condition.

With specific reference to FIG. 3, the solenoid 174 and rocker 172 are depicted in the first actuated position to restrict rotation of the ring gear 116 in a first direction of rotation 184. The plunger 178 is extended from the neutral position toward the center of the ring gear 116 in response to the application of a positive polarity power supply. Accordingly, the first end 182 of the rocker 172 is indexed radially toward the center of the ring gear 116 to engage one of the plurality of gear teeth 188 to restrict movement in the first direction 184. Notably, a second end 190 of the rocker 172 is indexed radially outward from the center of the ring gear 116 to provide clearance to the plurality of gear teeth 188 to allow unrestricted rotation in the second direction 186.

Conversely, FIG. 4 depicts the solenoid 174 and rocker 172 in the second actuated position to restrict rotation of the ring gear 116 in a second direction of rotation 186. The plunger 178 is retracted from the neutral position away from the center of the ring gear 116 in response to the application of a negative polarity power supply. The second end 190 of the rocker 172 is indexed radially toward the center of the ring gear 116 to engage one of the plurality of gear teeth 188 to restrict movement in the second direction. And, the first end 182 of the rocker 172 is indexed radially outward from the center of the ring gear 116 to provide clearance to the plurality of gear teeth 188 to allow unrestricted rotation in the first direction 184.

With specific reference to FIG. 5, the plunger 178 is biased by the internal spring toward a neutral state when no power is applied to the solenoid 174 to cause a dual-direction unlocked condition for the ring gear 116. More specifically, when the plunger 178 is located in the neutral position, it causes both the first end 182 and the second end 190 of the rocker 172 to provide clearance to the plurality of gear teeth 186 to allow unrestricted rotation of the ring gear 116 in both the first direction 184 as well as the second direction 186. In the example of FIG. 5, the rocker 172 defines a third position that allows both uninhibited forward rotation and rearward rotation of the ring gear 116. As described above, the solenoid may include a biasing member configured to urge the plunger 178 to a neutral position when the solenoid 174 is not energized.

According to some examples, the control system engages the engine brake mechanism by bringing the engine to a slightly non-zero speed, deploying the rocker, then reducing the engine speed further to zero. The direction of engine rotation is set in the opposite direction of the rotation restriction so that when the brake is activated, the rocker is initially ratcheting. Subsequently, once the engine rotation is stopped and then the generator torque is applied, torque that would otherwise cause the engine to rotate is applied in the locking direction and the ring gear remains stationary.

Certain previous solutions applied either a single one-way brake that only works in one direction, two separate one-way brake mechanisms with each brake working in opposite directions, or a single bidirectional brake that prevents all rotation of the engine shaft when engaged. Examples of the present disclosure maintain functionality in both forward and reverse directions while ensuring that only one brake is engaged at a time. This one-at-a-time arrangement is beneficial for handling brake failures or other mechanical hang-ups, because the flywheel may be rotated in the opposite direction to release the rocker allowing it to return to the disengaged position.

Each of the example engine brake mechanism of the present disclosure may be used to hold the transmission input shaft stationary during periods in which the engine is stopped. Once the ring gear is held in position, rotation caused by torque output from the generator may be efficiently transferred to the vehicle wheels. Related to the selectability of the braking direction, the brake mechanism may provide reaction torque in either of both rotation directions, so when the engine is deactivated the generator can be used to provide forward torque for forward propulsion as well as reverse torque for reverse propulsion. Moreover, the examples presented herein require minimal package space within the transmission case, and do not add axial length to the powertrain. Each can be located in available space around the periphery of the ring gear.

Figure 6A:
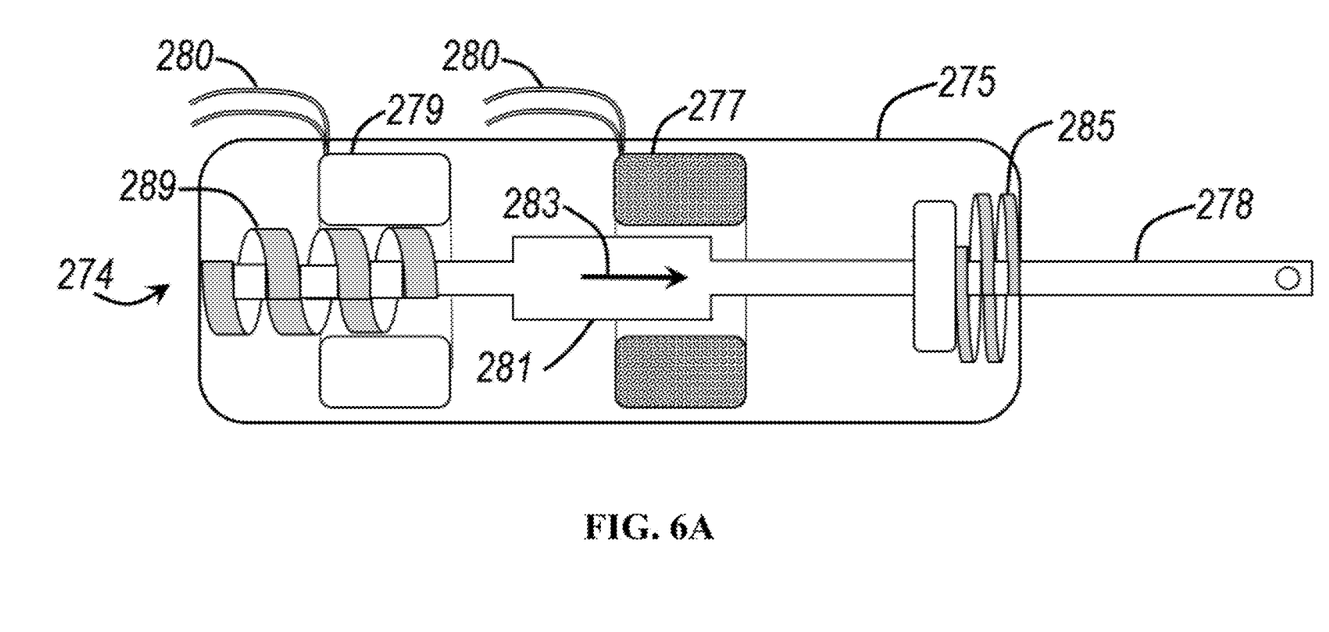
FIG. 6A is a schematic view of a solenoid actuator in a first position.
Figure 6B:
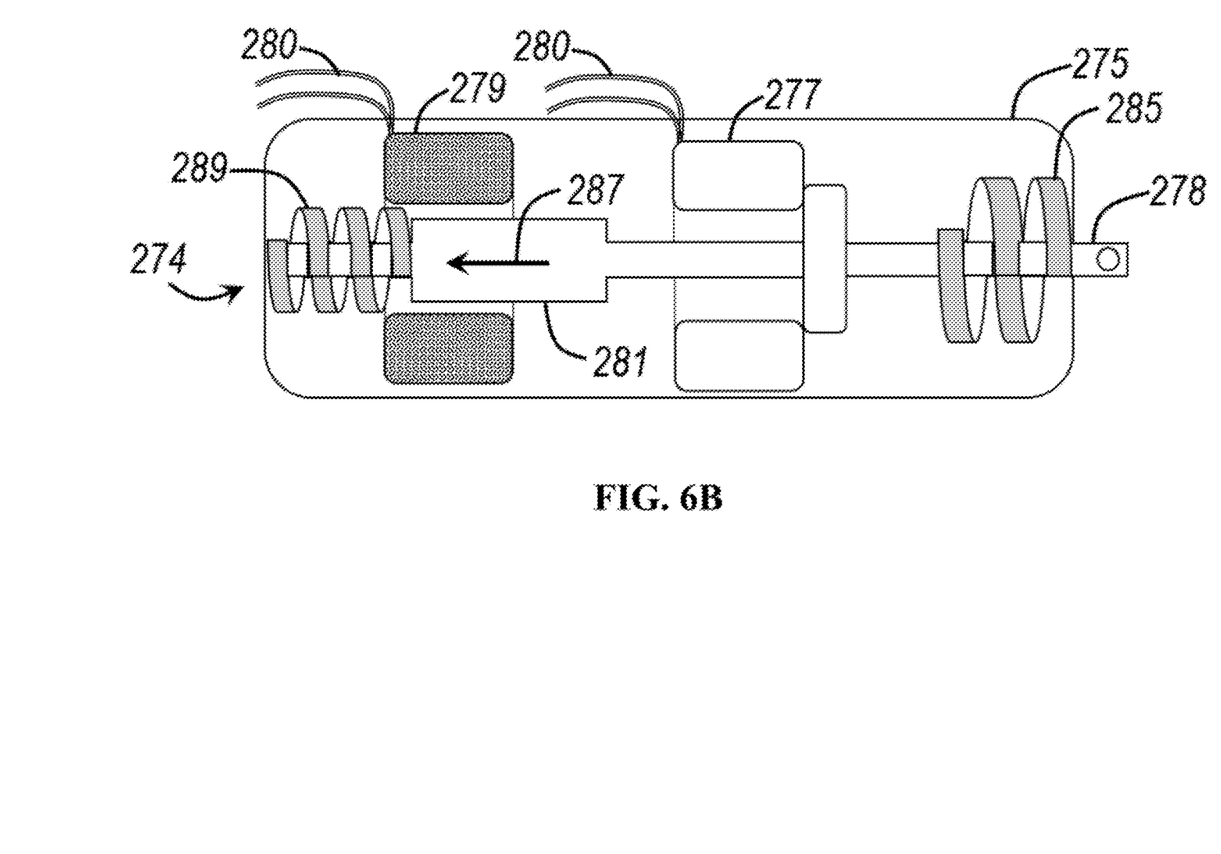
FIG. 6B is a schematic view of a solenoid actuator in a second position.
Figure 6C:
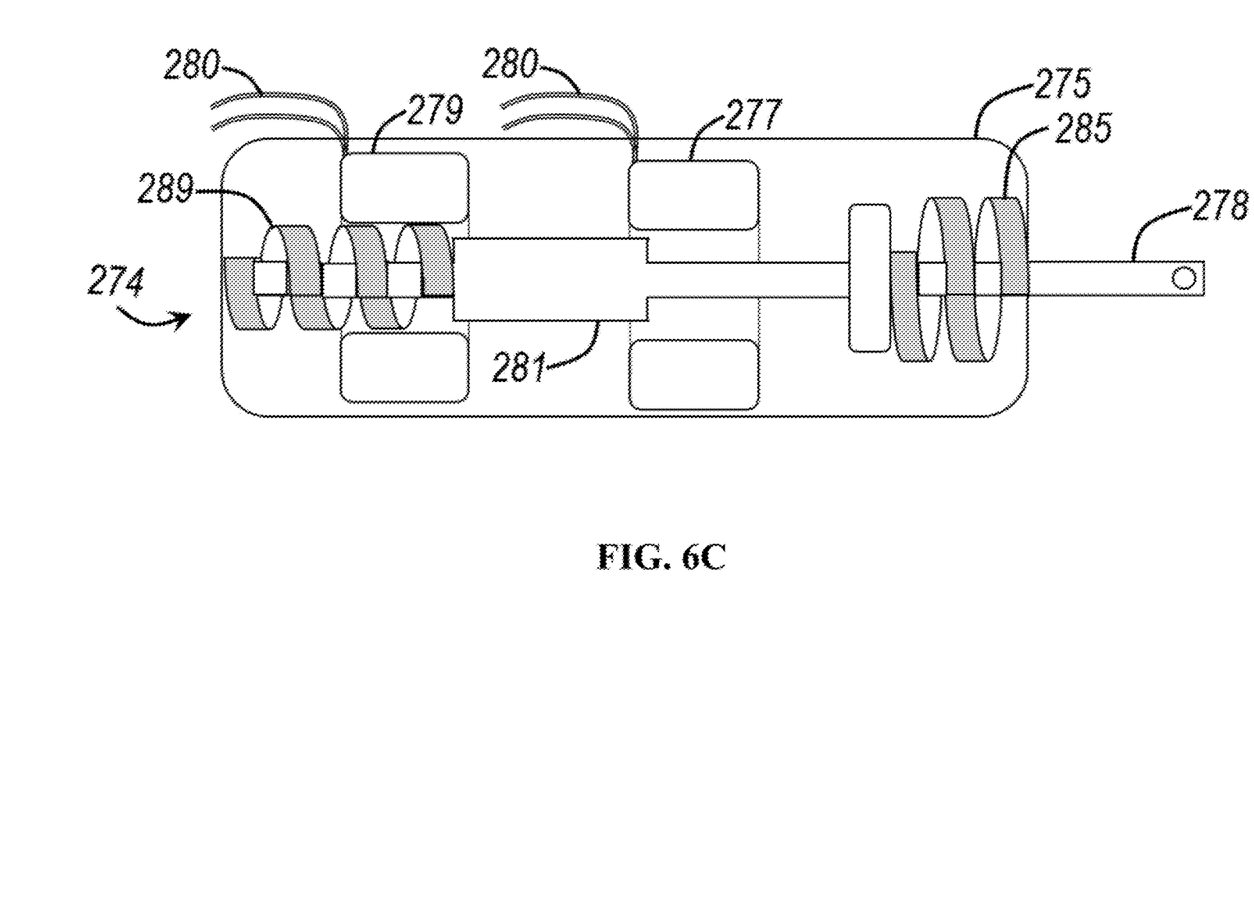
FIG. 6C is a schematic view of a solenoid actuator in a third position.

Referring to FIG. 6A through FIG. 6C, a schematic drawing of a two-coil solenoid 274 is provided by way of example. The solenoid 274 includes a housing 275 which may be secured to a portion of a transmission case. As discussed above, the solenoid 274 may include a first coil 277 and a second coil 279. Each of the first coil 277 and the second coil 279 is in electrical communication with a power supply via an electrical connection 280.

Referring to FIG. 6A, when power is supplied to the first coil 277, an electromechanical field is generated and acts upon a magnetic portion 281 of the plunger 278. In response the plunger 278 is driven along a first direction 283 toward a first actuated position such that the plunger is extended from the housing 275. A first return spring 285 is compressed while the plunger 278 is actuated to a predetermined first position.

Referring to FIG. 6B, when power is supplied to the second coil 279, a different electromechanical field is generated and acts upon the magnetic portion 281 of the plunger 278. In response, the plunger 278 is driven along direction 287 toward a second actuated position such that the plunger is retracted into the housing 275. A second return spring 289 is compressed while the plunger 278 is actuated to a predetermined second position.

Referring to FIG. 6C, when no power is supplied to either the first coil 277 or the second coil 279 of the solenoid 274, both of the first spring 285 and the second spring 289 act upon the plunger 278 to drive the plunger toward a predetermined third position. The third position may correspond to a neutral position where the solenoid allows unrestricted rotation of an engine component in multiple directions. While a dual-coil solenoid is presented by way of example, other solenoid types may be suitable according to the present disclosure. As discussed above, the electric actuator may be a single coil solenoid capable of actuating in different directions based on the polarity of the supplied power.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle powertrain comprising:
   an internal combustion engine having a crankshaft coupled to a flywheel having a ring gear;
   a transmission having an input shaft coupled to the flywheel; and
   a brake mechanism having a pivotable rocker configured to selectively inhibit crankshaft rotation, and an electric actuator configured to drive a plunger in connection with a first end of the rocker, wherein the first end engages the ring gear in a first position to inhibit forward rotation and a second end of the rocker engages the ring gear in a second position to inhibit rearward rotation, and wherein the plunger extends toward a center of the ring gear to cause the first end to engage the ring gear and retracts away from the center of the ring gear to cause the second end to engage the ring gear.

2. The vehicle powertrain of claim 1 wherein the rocker defines a third position that allows both uninhibited forward rotation and rearward rotation of the ring gear.

3. The vehicle powertrain of claim 2 wherein neither the first end nor the second end of the rocker engages the ring gear when the rocker is in the third position.

4. The vehicle powertrain of claim 2 wherein the electric actuator is a solenoid having a biasing member configured to urge the plunger to a neutral position when the solenoid is not energized.

5. The vehicle powertrain of claim 1 wherein the electric actuator is a solenoid and a first polarity current supplied to the solenoid extends the plunger to define the first position of the rocker, a negative current retracts the plunger to define the second position of the rocker, and an absence of current supplied to the solenoid drives the plunger to a neutral state to define a third position of the rocker.

6. The vehicle powertrain of claim 1 wherein the electric actuator is a solenoid and the solenoid includes a first coil to extend the plunger when energized to define the first position of the rocker, a second coil to retract the plunger to define the second position of the rocker, and a biasing member to urge the plunger to a neutral position when neither the first coil nor the second coil is energized.

7. A vehicle powertrain comprising:
   an internal combustion engine having a crankshaft coupled to a flywheel having a ring gear;
   a planetary gear set having a sun driveably connected to a first electric machine, a carrier coupled to the flywheel, and a ring driveably connected to a differential;
   a second electric machine driveably connected to the differential; and
   a brake mechanism having a solenoid configured to drive a first end of a rocker to selectively inhibit crankshaft rotation, wherein the solenoid drives the first end toward a center of the ring gear to inhibit forward rotation and drives the first end away from the center to inhibit rearward rotation, and wherein the rocker selectively engages at least one of a plurality of gear teeth of the ring gear to inhibit rotation.

8. The vehicle powertrain of claim 7 wherein the solenoid defines a neutral position where neither forward rotation nor rearward rotation of the crankshaft is inhibited by the rocker.

9. The vehicle powertrain of claim 8 wherein the solenoid includes a biasing member configured to urge the solenoid to the neutral position when the solenoid is not energized.

10. The vehicle powertrain of claim 7 wherein a second end of the rocker engages the ring gear when the first end is driven away from the center of the ring gear.

11. The vehicle powertrain of claim 10 wherein the solenoid includes a plunger connected to the first end, and a first polarity current supplied to the solenoid extends the plunger to cause the first end to engage the ring gear, a negative current retracts the plunger to cause the second end to engage the ring gear, and an absence of current supplied to the solenoid drives the plunger to a neutral state to cause a third position of the rocker.

12. The vehicle powertrain of claim 10 wherein the solenoid includes a plunger connected to the first end and a first coil to extend the plunger when energized to define a first position of the rocker, a second coil to retract the plunger when energized to define a second position of the rocker, and a biasing member to urge the plunger to a neutral position when neither the first coil nor the second coil is energized.

13. A transmission comprising:
    a flywheel having a ring gear adapted for fixation to a crankshaft of an internal combustion engine;
    an input shaft coupled to the flywheel; and
    a brake mechanism having a pivotable rocker configured to selectively inhibit crankshaft rotation, and a solenoid configured to drive a first end of the rocker to a first position to engage the ring gear to inhibit forward rotation, and to drive the first end to a second position to cause a second end of the rocker to engage the ring gear to inhibit rearward rotation, wherein the solenoid includes a plunger pivotally connected to the first end of the rocker, and wherein the solenoid drives the plunger toward a center of the ring gear to inhibit forward rotation and drives the plunger away from the center to inhibit rearward rotation.

14. The transmission of claim 13 wherein a first polarity current applied to the solenoid extends the plunger to define the first position, a negative current retracts the plunger to define the second position, and an absence of current applied to the solenoid drives the plunger to a neutral state to cause a third position of the rocker.

15. The transmission of claim 13 wherein the solenoid defines a neutral position where neither forward rotation nor rearward rotation of the crankshaft is inhibited by the rocker.

16. The transmission of claim 15 wherein the solenoid includes a biasing member configured to urge the solenoid to the neutral position when the solenoid is not energized.

* * * * *